United States Patent [19]

Klavons et al.

[11] Patent Number: 5,286,511
[45] Date of Patent: Feb. 15, 1994

[54] CLOUDING AGENT FOR BEVERAGES AND METHOD OF MAKING

[75] Inventors: Jerome A. Klavons; Raymond D. Bennett, both of Pasadena; Sadie H. Vannier, Sierra Madre, all of Calif.

[73] Assignee: The United States of America as represented by the Secretary of Agriculture, Washington, D.C.

[21] Appl. No.: 965,308

[22] Filed: Oct. 23, 1992

[51] Int. Cl.$^5$ .................. A23L 1/0524; A23L 1/20; A23L 2/38
[52] U.S. Cl. ............................ 426/577; 426/599; 426/616; 426/626; 426/634; 426/656
[58] Field of Search ............... 426/577, 599, 616, 626, 426/634, 656

[56] References Cited

U.S. PATENT DOCUMENTS

| | | | |
|---|---|---|---|
| 4,349,577 | 9/1982 | Tessler | 426/590 |
| 4,388,330 | 6/1983 | Wobben et al. | 426/599 |
| 4,486,413 | 12/1984 | Wiesenberger et al. | 426/599 |
| 4,656,044 | 4/1987 | Sugimoto et al. | 426/577 |

Primary Examiner—Helen F. Pratt
Attorney, Agent, or Firm—M. Howard Silverstein; John D. Fado

[57] ABSTRACT

Beverages such as orange juice are stably clouded by the suspension of soy protein particles therein. A new procedure is provided to cause such suspension, in which pectin prevents suspended protein particles from aggregating to the point of settling out.

9 Claims, No Drawings

CLOUDING AGENT FOR BEVERAGES AND METHOD OF MAKING

FIELD OF INVENTION

The present invention relates to imparting desirable cloud to beverages, i.e., drinks suitable for human consumption.

PRIOR ART

Cloudiness or turbidity in beverages such as orange juice contributes to the quality and desirability of these drinks. Present clouding agents include the use of vegetable gums to increase medium viscosity, finely ground citrus pulp or peel, and brominated, or other derivatives of vegetable oils.

SUMMARY

It now has been discovered that acidic beverages may be clouded by the suspension therein of particles of soy protein that is soluble in an alkaline medium but insoluble in an acidic environment. The suspended particles range in size from invisible (to the naked eye) to visible, but all are able to effectively scatter visible light by the Tyndall effect.

To cause such suspension, pectin or pectic compounds are dissolved in the acidic beverage prior to addition of an alkaline medium containing the protein in a dissolved state. The pectin is able to control aggregation of the protein as it becomes insolubilized, so that aggregation proceeds to the point wherein the resultant particles are able to scatter light by the Tyndall effect, but are not so large that settling out occurs. This range of particle sizes hereinafter is referred to as "partial aggregation" or "partially aggregated."

The clouding effect is created by such partial aggregation. If aggregation proceeds beyond partial aggregation, particles begin to settle out of the liquid, and the cloud effect is significantly reduced or eliminated. It should be understood that the clouding effect is not due to viscosity changes that possible may be caused by the addition of pectin, but rather is due to the ability of the pectin to significantly slow down the ability of the protein particles to aggregate.

As used herein the term "cloud" or "cloudiness" means turbidity that is characterisitic of orange or grapefruit juices, as opposed to typical clarified juices such as apple juice.

It therefore is an object of the present invention to provide a clouding agent that does not rely on medium viscosity.

A further object is to provide an agent that does not employ finely ground citrus pulp or peel which tend to aggregate and often are bitter.

Another object is to provide an alternative to currently available clouding agents.

Still a further object is to provide a clouding agent that includes nutritional benefits.

Yet another object is to provide a clouding agent that remains in suspension.

Still another object is to provide turbidity for at least a mouth.

Yet another object is to prevent excessive aggregation of suspended protein particles.

An even further object is to provide cloud in any acidic beverage.

Other objects and advantages will be obvious from the following detailed description of the invention.

DETAILED DESCRIPTION

The soy proteins that are used in the present invention are soluble at alkaline pH, e.g., 8.0–12.0, and have acidic isoelectric points such that, when added in a dissolved state to an acidic medium, e.g., pH 2.0–6.0, they start forming small nascent primary particles ranging in size from 0.1–0.26 micrometers. Once the primary particles are formed, they ordinarily would aggregate to the point of settling out, but for the presence of pectin.

Isolated soy protein that is commercially available as a food grade material is suitable as a soy protein source. The crude source of the protein ordinarily is not preferred due to the usual presence of extraneous, undesirable flavor-imparting material. The isolated protein may be separated, by known means, into fractions of different proteins in order to ascertain the proteins that are most effective in cloud formation and stability.

The protein generally may be added in an amount of about 10–2000 mg/100 ml of beverage, which amount may vary depending upon such factors as the purity of the protein. Higher concentrations of the protein tend to decrease the time that the turbity lasts.

It is important to solubilize the pectin in the beverage prior to addition of protein. If added during or after protein addition, excessive aggregation and settling out of protein particles still will occur, with the loss of cloud effect.

The pectin is able to control the degree of aggregation of the particles, so as to maintain partial aggregation, i.e., particles ranging from about 0.4 micrometers to larger-but-still-suspended particles, e.g., as large as 5 micrometers. The upper size limit of the suspended particles depends upon the viscosity of the beverage. For example, in mediums that are more viscous than citrus liquids, suspended particles greater than 5 micrometers may be present, to contribute toward the cloud effect.

The pectin may be added in an amount of about 200 to 1000 micrograms/ml of beverage. If too much pectin is present, it becomes too efficient in preventing aggregation, whereby the particles remain too small to effectively scatter visible light.

Pectins are regarded as polygalacturonic acids whose carboxyl groups are partly esterified with methyl alcohol, the structure being essentially chain-like, as in the case of cellulose, with some branched regions having a high neutral sugar content. It is believed that the carboxyl groups of the pectin are important in regard to maintainance of partial aggregation because tests have demonstrated, with the addition of fully methyl esterified pectin in lieu of pectin, there is substantial settling out, and the clouding effect is greatly reduced.

Pectin of relatively high molecular weight (e.g., 30,000 to 300,000) is most preferred for maintainance of cloud stability. Substitutes such as any pectic compound derived from or structurally related to pectin also may be employed.

The pectin is able to maintain partial aggregation for periods as long as naturally-occuring orange juice cloud. After cloud is lost, it may be re-established, to some degree, by agitation.

Any acidic beverage, including non-citrus and non-juice drinks, can be clouded in the manner of the present invention. Liquid temperature at the time of clouding generally may range from about 2° C. to about 90° C.

The following example illustrates a laboratory scale procedure to suspend protein in a beverage.

EXAMPLE

Step A

Preparation of Simulated Juice Serum

A medium simulating the pH and ionic strength of orange juice was prepared by adding to water 1% citric acid, 5.4% sucrose, and 5.4% invert sugar (2.7% glucose and 2.7% fructose), adjusted to pH 3.7 with 5N potassium hydroxide.

Step B

Preparation of Pectin Solution

Soluble citrus pectin "stock" solution was prepared by:
1. adding to the medium of step A 10 mg pectin/ml of medium;
2. heating the mixture to 90° C., cooling to room temperature, thereafter stirring with a magnetic stir bar at room temperature; and repeating these three steps for several hours;
3. subsequently stirring overnight at 4° C.; and
4. filtering through Whatman #4 filter paper.

Thereafter, varying quantities of "stock" solution, 0–5000 μl, were added to *additional* volumes of the medium of step A, such that the total volume of each sample was 9.0 ml.

Step C

Preparation of Solubilized Protein

Isolated soy protein containing 91.5% protein (moisture free basis), was treated for the purpose of solubilization as follows: One gram was added to approximately 80 ml of deionized water containing enough potassium carbonate to yield 20 mM at final dilution (see the volume readjustment step discussed below). The resulting suspension was stirred with a magnetic stir bar for approximately 30 minutes. The pH was adjusted to 11.0 with 5N potassium hydroxide and the final volume adjusted to 100 ml. The suspension then was heated to 95° C. for 30 minutes and the volume readjusted to 100 ml. The suspension subsequently was stirred overnight at 4° C. and then centrifuged at 27,000 g for 15 minutes to form solubilized protein and a pellet containing undissolved protein and polysaccharides. The solubilized protein fraction was decanted from the pellet and stored at 4° C.

Step D

Precipitation of Solubilized Protein 1 ml aliquots of solubilized protein of step C were added to each of the 9.0 ml samples produced in step B to produce 10 ml samples. The resulting solutions were vortexed thoroughly and stored at 4° C.

Test results from the above showed that, without the pectin, although about ⅓ of the protein remain solubilized, there was no significant cloud because rapid aggregation occurred resulting in almost immediate cloud loss. With 200 μl added pectin, the resulting suspended protein particles were only slightly less stable than natural orange juice cloud. At 500 μl added pectin, the resulting suspended protein particles were equally stable as natural orange juice cloud. At 1000 μl and above, the stability of the resulting suspended protein particles were equal or greater than that of natural orange juice cloud particles.

In yet other tests, successful clouding was produced from the addition, to the pectin-containing medium, of protein solutions, pH 11.0, wherein the potassium carbonate strength of such solutions was 10 and 30 mM. At 50 mM, the solubility of the protein in the alkaline solution decreased slightly and continued to do so at 75 and 100 mM. However, the distinction in these experiments between soluble and insoluble protein is subtle as it is based on centrifugation parameters. For example, a "particle" may be so small that it remains in suspension under some centrifugation parameters, i.e., 27,000 g for 15 minutes, whereby suspended particles may be added to the pectin-containing medium, together with solubilized protein, but not adversely affect the desired cloud.

It will be obvious to those skilled in the art, that there may be many variations in the step of solubilizing the protein. For example, substitutes for potassium bicarbonate would include sodium bicarbonate, sodium and potassium carbonate, sodium and potassium phosphate, sodium and potassium hydroxide. For adjusting to pH 11.0, sodium hydroxide may be substituted for potassium hydroxide.

It also will be obvious that there may be many variations in the step of solubilizing the pectin. For example, the heating step may be eliminated, or the heating temperature varied.

The specific steps described above for clouding simulated juice serum are suitable for effectively clouding real orange juice serum, i.e., natural juice in which suspended pulp and cloud particles have been removed. With minor variations which readily may be ascertained by those skilled in the art, without undue experimentation, the procedure may be modified to cloud many beverages as disclosed above.

We claim:

1. An acidic beverage comprising
    a. partially aggregated soy protein particles that provide a cloud in said beverage; and
    b. an additive that maintains said partial aggregation of soy protein particles, said additive selected from the group consisting of pectin and pectic compounds;
wherein said beverage contains 10–2000 mg of said protein per 100 ml, and 200–1000 micrograms of said additive per ml.

2. The composition of claim 1 wherein said beverage has a pH of about 2.0–6.0.

3. The composition of claim 2 wherein said beverage is produced from citrus juice.

4. The composition of claim 2 wherein said additive is pectin.

5. The composition of claim 3 wherein said additive is pectin.

6. A method of suspending soy protein in an acidic beverage to cloud said beverage comprising
    a. dissolving an additive selected from the group consisting of pectin and pectic compounds in said beverage, to form an additive-containing beverage;
    b. dissolving said protein in an alkaline medium; said protein being insoluble in an acidic medium;
    c. adding said dissolved protein to said additive-containing beverage so that said protein forms nascent particles in said beverage; wherein said protein is added in an amount so that said beverage contains 10–2000 mg of said protein per 100 ml; wherein said additive is added in an amount so that said beverage contains 200–1000 micrograms of said additive per ml; wherein said additive is added in an amount able to control aggregation of said particles, wherein said additive is added in an amount that maintains partial aggregation and suspension of said protein in said beverage.

7. The method of claim 6 wherein said beverage is made from citrus juice.

8. The method of claim 6 wherein said additive is pectin.

9. The method of claim 7 wherein said additive is pectin.

* * * * *